April 14, 1970   H. LIST ET AL   3,505,862

PIEZOELECTRIC PRESSURE MEASURING INSTRUMENT

Filed April 23, 1968

Inventors
Hans List
Rudolf Zeiringer
By
Watson, Cole, Grindle & Watson
Attys.

3,505,862
PIEZOELECTRIC PRESSURE MEASURING INSTRUMENT
Hans List, 126 Heinrichstrasse, Graz, Austria, and Rudolf Zeiringer, Graz, Austria; said Zeiringer assignor to said List
Filed Apr. 23, 1968, Ser. No. 723,436
Claims priority, application Austria, May 11, 1967, A 4,456/67
Int. Cl. G01l 23/10, 23/28
U.S. Cl. 73—115                                                     1 Claim

ABSTRACT OF THE DISCLOSURE

A piezoelectric measuring instrument for the measurement of high temperature ranges in which a transducer housing is provided with a measuring element with cooling members surrounding the housing and the cooling surfaces on the cooling members being in heat conducting contact with a wall of the housing.

---

Figure 1:
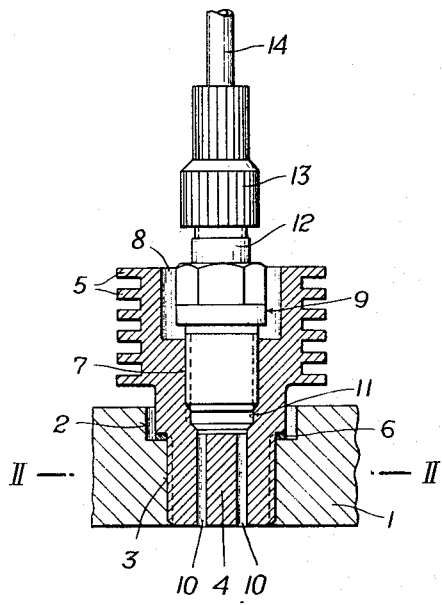

The invention relates to a piezoelectric measuring instrument for measurements in high temperature ranges, comprising a piezoelectric measuring element enclosed in a transducer housing. Certain measurements during which piezoelectric transducers are subject to high temperatures, as for example, the piezoelectric measurement of the combustion chamber pressure in internal combustion engines, require continued cooling of the transducer in order to avoid thermal expansions liable to alter the prestress of the measuring element which might easily be mistaken for a variation of the test data. Moreover, at high temperatures the sensitivity of the piezoelectric measuring crystals which diminishes rapidly when approaching the Curie temperature, is a major factor responsible for erroneous results of measurements. In order to keep the thermal stress on similar transducers within limits, cavities are recessed in conventional transducers and communicate with a special cooling water system. The cost of such a cooling water system comprising a water pump, a multitude of pipes and various devices for temperature and throughput control is comparatively high and justified only for research and development projects. Besides, in order to preclude premature calcification of the transducer similar cooling systems have to be operated with distilled water which is generally feasible only in connection with stationary measuring equipment.

For transducers in continuous operation, such as for engine monitoring, the provision of an expensive cooling system is most objectionable. In addition, similar cooling systems require considerable space and lack dependability for continuous operation.

It is the object of the present invention to provide a considerably simplified piezoelectric measuring device suitable for continuous operation and offering a high degree of operational safety also at high operating temperatures. According to the invention, the shell of the transducer housing communicates with cooling surfaces of cooled elements surrounding the transducer so as to abduct the heat received by the transducer, the said cooled elements being arranged in such a manner as to be exposed to a stream of coolant and/or cooled directly by the ambient air. For the majority of applications this arrangement affords adequate cooling for the transducer without the need for expansive and sometimes delicate cooling devices.

The invention takes advantage of the face that transducers subject to high temperatures, such as for example, those used in connection with the cylinder heads of internal combustion engines, usually comprise elements cooled by a cooling system associated with the object to be measured and which can be conveniently used for the abduction of the heat received by the transducer. On the other hand, however, such measuring points as are devoid of any cooled walls in their immediate vicinity, generally offer some possibility of a heat exchange between the cooling surfaces of the transducer housing and the ambient air. This applies in particular to such objects of measurements as comprise a cooling-air blower of their own. Highly favorable cooling conditions for the transducer can be provided in view of a better heat transfer by the appropriate arrangement of the cooling surfaces adjoining the transducer directly in the stream of cooling air. Given conditions at the measuring point permitting, joint application of the cooling measures according to the invention may produce favorable results.

According to a preferred embodiment of the invention the shell of the transducer housing is surrounded by a cooled sleeve made of a highly heat-conducting material such as aluminum carrying cooling ribs on its circumference and presenting an externally threaded stem to be screwed into a receiving bore provided at the measuring point. This design offers the particular advantage that commercial transducers can be used for the purpose without modification. In addition to the abduction of heat from the transducer housing and to its transfer to the cooling air, the cooling sleeve can also be used for the protection of the sensing surfaces of the transducer against direct attack by the hot medium, for example, by combustion gases. For that purpose, the sleeve can be provided with a number of small connecting bores between the measuring point and the sensing surface of the transducer, so as to abduct part of the heat of the medium already in this area of the cooling sleeve, thereby protecting the transducer from excessive heat.

According to the invention, favorable heat transfer conditions from the transducer housing to the cooling sleeve are due to the fact that the transducer housing is provided with a male screw thread by means of which it is screwed into an internal thread of the narrower portion of the stepped-down blind-end bore of the cooling sleeve.

A preferred application of the measuring instrument according to the invention is the measurement of the combustion chamber pressure in the cylinders of a water-cooled internal combustion engine featuring an indicator bore surrounded by water-cooled walls of the cylinder head and containing the transducer. In this connection, according to a preferred embodiment of the invention the shell of the transducer housing is screwed into an expanding sleeve made of a highly heat-conducting material such as aluminum, the smooth cylindrical outer surface of which adjoins the inner surface of the indicator bore exposed to the coolant current, the expanding sleeve presenting a longitudinal expansion split on the side facing away from the measuring point, as well as a female thread destined to receive a threaded expanding cone. Thus heat is abducted towards the water-cooled cylinder-head walls, particularly advantageous heat transfer conditions between the expanding sleeve and the cylinder head wall being provided by the pressure applied by the expanding sleeve expanded by means of the expanding cone. This design is particularly suitable for use in connection with large-size water-cooled engines the cylinder-head of which is of considerable thickness.

Finally, according to a particularly simple embodiment of the invention, cooling ribs are provided on the shell of the transducer housing proper. This embodiment of the invention which is particularly useful in connection with air-cooled internal combustion engine requires the transducer housing to consist of a material of outstanding heat conductivity.

Figure 3:
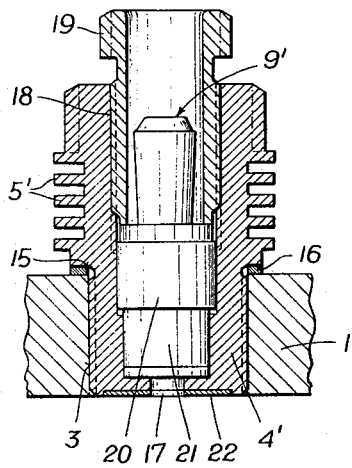
Figure 2:
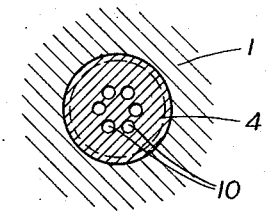
Figure 4:
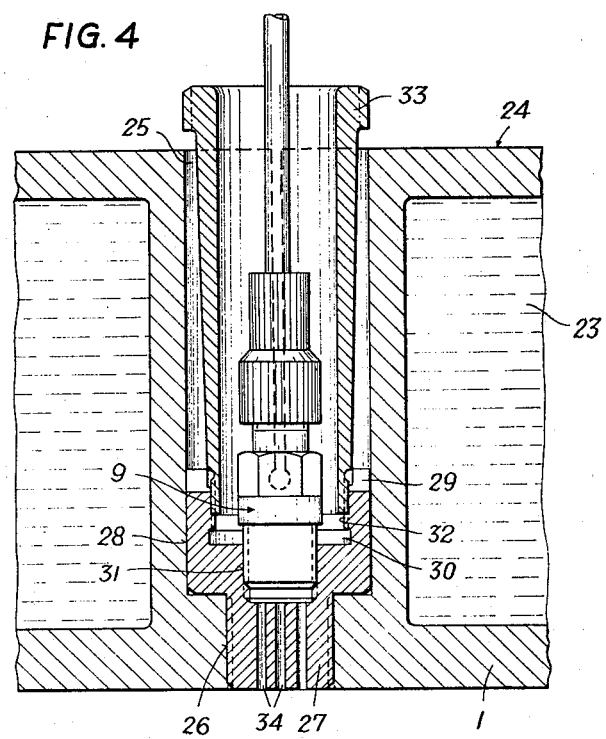
Figure 5:
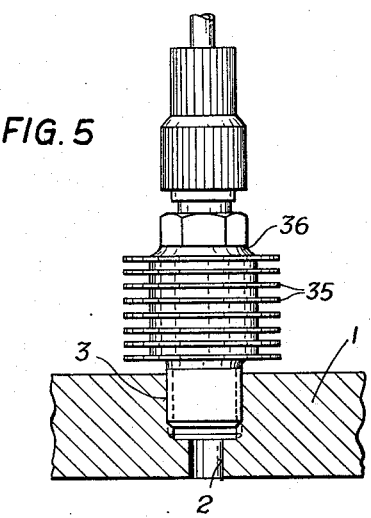

Further details of the invention will appear from the following description of several embodiments of the invention with reference to the accompanying drawings in which:

FIG. 1 shows an axial cross-sectional view of essential elements of a measuring instrument according to the invention, FIG. 2 a horizontal cross-sectional view of the embodiment illustrated in FIG. 1 on line II—II, FIG. 3 an axial cross-sectional view of another embodiment of the invention, FIG. 4 an axial cross-sectional view of yet another embodiment of the invention as used for measurements in connection with water-cooled internal combustion engines, and FIG. 5 a measuring device according to the invention of simplified design.

The embodiments of the invention illustrated in the drawings refer to the application of the invention to piezoelectric pressure measurements of hot media only. The wall 1 of the cylinder-head bottom of an internal combustion engine, the inner surface of which is impinged upon by the pressure to be measured, is provided with a through receiving bore 2 with a female thread 3.

In the embodiment of the invention shown in FIGS. 1 and 2 a necked-down cylindrical cooling sleeve 4 of a heat-conducting material, such as aluminum, copper or a copper-beryllium alloy is screwed into the female thread 3. The portion of the cooling sleeve 4 protruding over and above the wall 1 of the object to be measured carries cooling ribs 5 on its circumference. A gasket 6 adjoining a shoulder of the cooling sleeve 4 serves to seal the measuring point off against the outside.

On the side facing away from the measuring point the cooling sleeve 4 is provided with a stepped-down central blind-end bore 8 presenting a female thread 7 receiving the piezoelectric transducer 9. From the blind-end bore 8 a number of parallel connecting bores 10 extend in the direction of the measuring point. Between the front end of the transducer 9 facing the measuring point and a corresponding shoulder of the blind-end bore 8 a gasket 11 is provided. To the terminal head 12 of the transducer 9 the measuring line 14 leading to the charge amplifier (not shown) is connected in a manner known per se by means of a cap screw 13.

The hot pressure medium impinges upon the sensing surface of the transducer 9 via the connecting bores 10 wherein it transfers part of its heat to the cooling sleeve 4, thereby reducing the thermal stress on the sensing surface of the transducer 9, preferably constituted by a thin-walled membrane, considerably. From the transducer housing proper heat is transferred via the female thread 7 to the cooling sleeve 4 which in turn performs a heat exchange with the atmosphere by means of the cooling ribs 5. In this manner excessive heat stress on the temperature-sensitive elements of the transducer is avoided.

In the embodiment of the invention shown in FIG. 3 the cooling sleeve 4' rests with a shoulder 15 with the interposition of a gasket 16 on the outer surface of the wall 1 of the object to be measured. The cooling sleeve 4' carrying cooling fins 5' on its circumference has a multi-stepped central through bore 17 with an internally threaded member 18.

The transducer 9' which is braced in the direction of the measuring point by means of a sleeve 19 screwed into the threaded portion 18 is provided with a shell defined by smooth cylindrical surfaces 20 and 21. Heat is transferred from the transducer housing to the cooling sleeve 4' and from there via cooling fins 5' to the atmosphere via the said shell surfaces 20 and 21 in contact with mating surfaces of the bore 17. A disk 22 mounted on the front end of the cooling sleeve 4' and made of a heat-insulating material furthermore prevents any direct heat exchange between the cooling sleeve 4' and the hot medium.

FIG. 4 illustrates the use of the measuring device according to the invention in connection with a water-cooled internal combustion engine. The cylinder head 24 which is only partly shown in the drawing includes a cooling-water chamber 23 and presents an indicator bore 25 with a threaded portion 26 into which the threaded stem of an expanding sleeve 27 of a heat-conducting material is screwed. The expanding sleeve 27 has a smoothly surfaced shell 28 and is provided with two longitudinal expanding slots 29 on the side facing away from the measuring point. The expanding sleeve 27 presents a stepped-down blind-end bore 30 with a female thread 31 for receiving the transducer 9 and a threaded portion 32 of a larger diameter for receiving an expanding cone 33 inserted in the indicator bore 25. By tightening the expanding cone 33 the expanding sleeve 27 is radially expanded and pressed with its cylindrical shell surface 28 against the inner surface of the indicator bore 25, thus producing particularly favorable heat transfer conditions from the expanding sleeve to the wall of the cylinder head 24 the inner surface of which is wetted by the cooling water. Likewise, the expanding sleeve 27 is provided with a number of connecting bores 34 for the passage of the combustion gases from the cylinder of the internal combustion engine to the sensing surface of the transducer 9.

In the embodiment of the invention shown in FIG. 5 cooling fins 35 are provided directly on the shell of the transducer. This design is particularly suitable for use in connection with air-cooled internal combustion engines, the cooling fins 35 being directly exposed to the cooling-air current. The housing 36 of this type of transducer is made of a highly heat-conducting material.

We claim:

1. A piezoelectric measuring instrument for the measurement of the combustion chamber pressure in the cylinders of a water-cooled internal combustion engine, comprising a transducer housing, a piezoelectric measuring element enclosed in the said transducer housing, the cylinder head of the said internal combustion engine having a stepped-down indicator bore and a female thread provided in a narrow portion of the said indicator bore, a wider portion of the indicator bore being surrounded by water-cooled walls of the cylinder head, a cooling sleeve consisting of a heat-conducting material and screwed into the said female thread of the indicator bore, the said cooling sleeve having a smooth cylindrical shell surface adjoining the inner surface of the wider portion of the said indicator bore, the cooling sleeve having longitudinal expansion slits provided therein on the side of the cooling sleeve facing away from the cylinder of the internal combustion engine, a female thread on the said cooling sleeve, a tubular insert having a conical shell surface, a male thread at the end of the said insert having the smaller diameter, the said insert being screwed into the said female thread of the cooling sleeve, a second female thread on the said cooling sleeve having a smaller diameter than the first-mentioned female thread of the cooling sleeve, and a male thread on the said transducer housing, the latter being screwed with its male thread into the said second female thread of the cooling sleeve.

References Cited

UNITED STATES PATENTS

| | | | |
|---|---|---|---|
| 2,068,744 | 1/1937 | Gutzke | 73—389 |
| 2,163,518 | 6/1939 | Postlethwaite | 73—115 |
| 2,190,713 | 2/1940 | Hintze et al. | 73—115 X |
| 2,266,315 | 12/1941 | Frawley et al. | 73—115 X |
| 2,392,581 | 1/1946 | Juhasz | 73—115 |
| 3,020,763 | 2/1962 | Davis | 73—389 |
| 3,216,244 | 11/1965 | Borchers | 73—115 |

JERRY W. MYRACLE, Primary Examiner

U.S. Cl. X.R.

73—389